G. W. BINGHAM.
MOVING PICTURE PROJECTOR.
APPLICATION FILED APR. 24, 1919.

1,371,218.

Patented Mar. 15, 1921.
6 SHEETS—SHEET 1.

G. W. BINGHAM.
MOVING PICTURE PROJECTOR.
APPLICATION FILED APR. 24, 1919.

1,371,218.

Patented Mar. 15, 1921.
6 SHEETS—SHEET 2.

G. W. BINGHAM.
MOVING PICTURE PROJECTOR.
APPLICATION FILED APR. 24, 1919.

1,371,218.

Patented Mar. 15, 1921.
6 SHEETS—SHEET 4.

INVENTOR
George W. Bingham
BY
his ATTORNEY

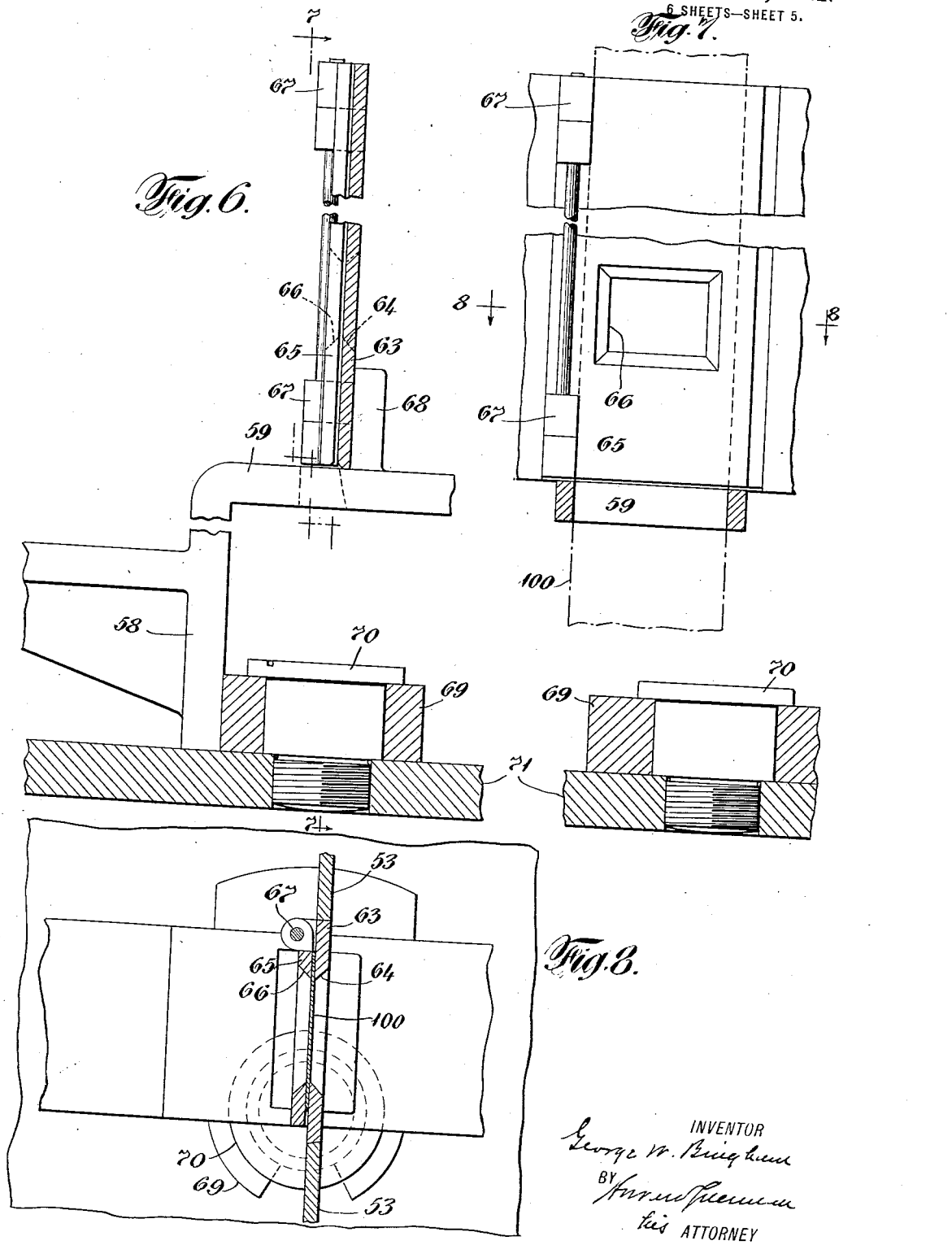

G. W. BINGHAM.
MOVING PICTURE PROJECTOR.
APPLICATION FILED APR. 24, 1919.
1,371,218.
Patented Mar. 15, 1921.
6 SHEETS—SHEET 6.
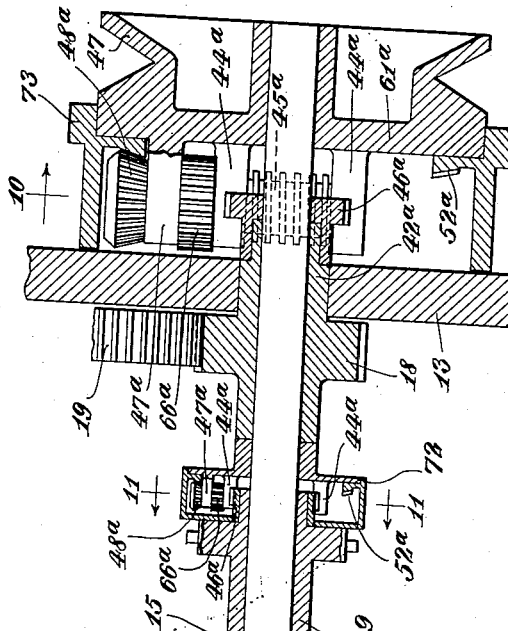
Fig. 9.
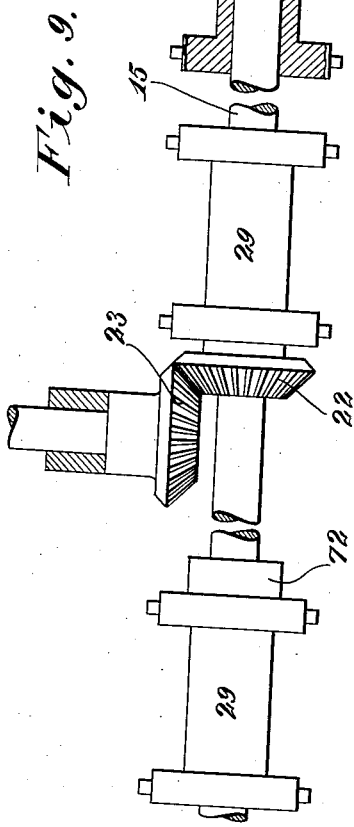
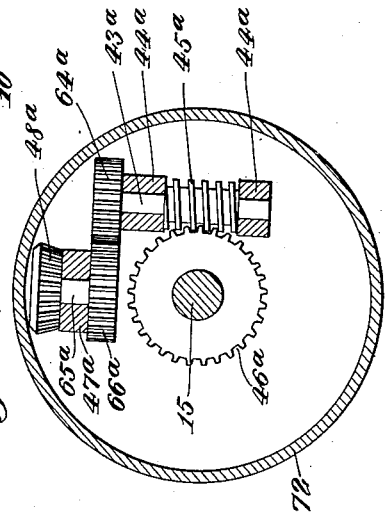
Fig. 11.
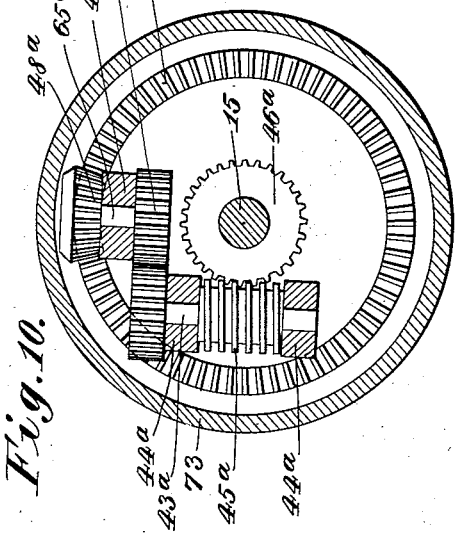
Fig. 10.
George W. Bingham, Inventor
By his Attorney

UNITED STATES PATENT OFFICE.

GEORGE W. BINGHAM, OF JERSEY CITY, NEW JERSEY, ASSIGNOR TO WIDESCOPE CAMERA CO., A CORPORATION OF NEW JERSEY.

MOVING-PICTURE PROJECTOR.

1,371,218.  Specification of Letters Patent.  Patented Mar. 15, 1921.

Application filed April 24, 1919. Serial No. 292,366.

*To all whom it may concern:*

Be it known that I, GEORGE W. BINGHAM, a citizen of the United States, residing in Jersey City, county of Hudson, and State of New Jersey, have invented certain new and useful Improvements in Moving-Picture Projectors, of which the following is a full, clear, and exact specification.

My invention relates to moving picture projectors and refers particularly to projectors capable of projecting a plurality of pictures.

One object of my invention is a projector capable of simultaneously projecting a plurality of pictures.

Another object of my invention is a projector capable of simultaneously projecting a plurality of pictures by means of a plurality of films.

Another object of my invention is a projector capable of simultaneously projecting a plurality of pictures into a complete single picture.

Another object of my invention is a projector capable of simultaneously projecting a plurality of pictures upon a plurality of films into a complete single picture.

Another object of my invention is a projector capable of correlating a plurality of pictures upon a plurality of films.

These and other objects will be evident upon a consideration of my drawings, specification and claims.

The ordinary moving picture projector is capable of projecting from a single film and hence the picture produced upon the screen is limited to the possibilities of a single picture taken upon a single film. The angular extent of the projected picture is therefore limited to the angular scope, or view, of a single lens within the moving picture camera.

While attempts have been made to increase the extent of the projected picture by simultaneously projecting upon the screen a series of pictures in correlation with each other, difficulties incident to such projection have not been overcome, with the result that the projections have been unsatisfactory.

The device of my application overcomes all of these difficulties and presents a means whereby the pictures upon a plurality of standard films may be simultaneously projected upon a screen in an accurate correlated position, thus producing a picture of greater angular extent than has been previously possible.

In the accompanying drawings, illustrating one form of the device of my invention, similar parts are designated by similar numerals:—

Fig. 6 is a fragmentary detailed elevation through the line 6—6 of Fig. 2, parts removed.

Fig. 7 is a section through the line 7—7 of Fig. 6.

Fig. 8 is a section through the line 8—8 of Fig. 7.

Fig. 9 is a vertical broken cross-section through the shaft 15 and its parts showing the framing means.

Fig. 10 is a section through the line 10—10 of Fig. 9.

Fig. 11 is a section through the line 11—11 of Fig. 9.

Figure 1:
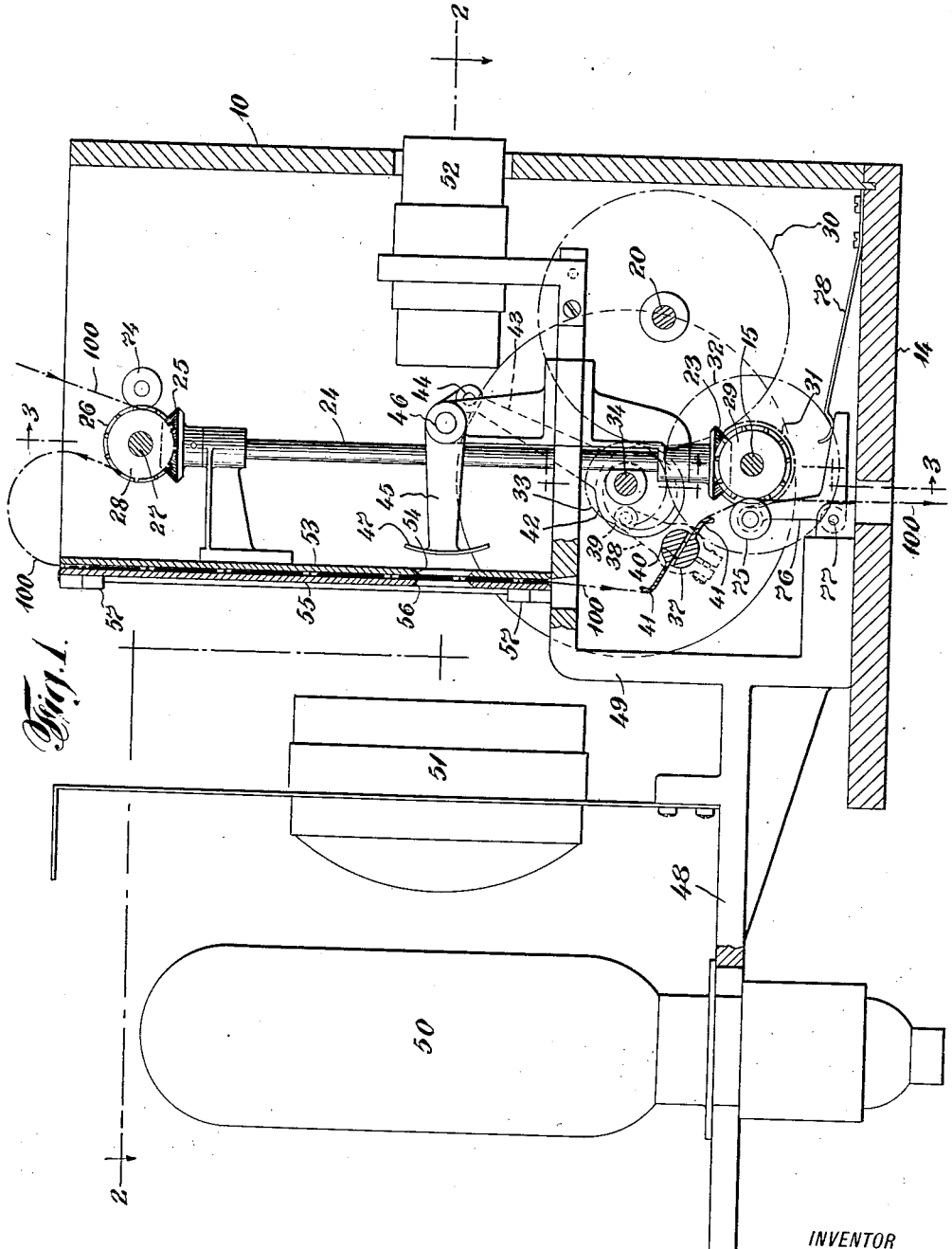
Figure 1 is a mid-vertical section of one form of my device, with parts removed.
Figure 2:
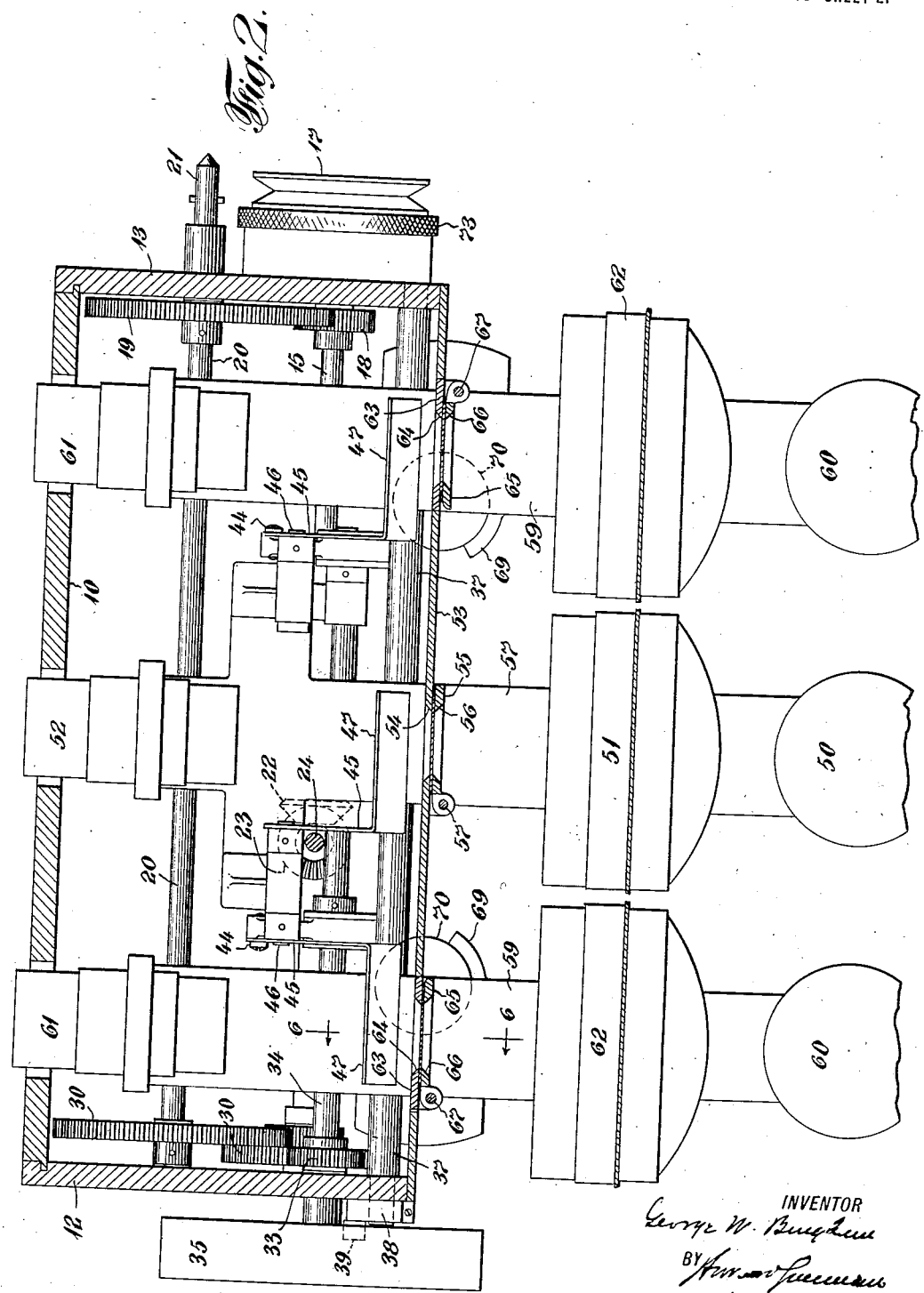
Fig. 2 is a section through the line 2—2 of Fig. 1.
Figure 3:
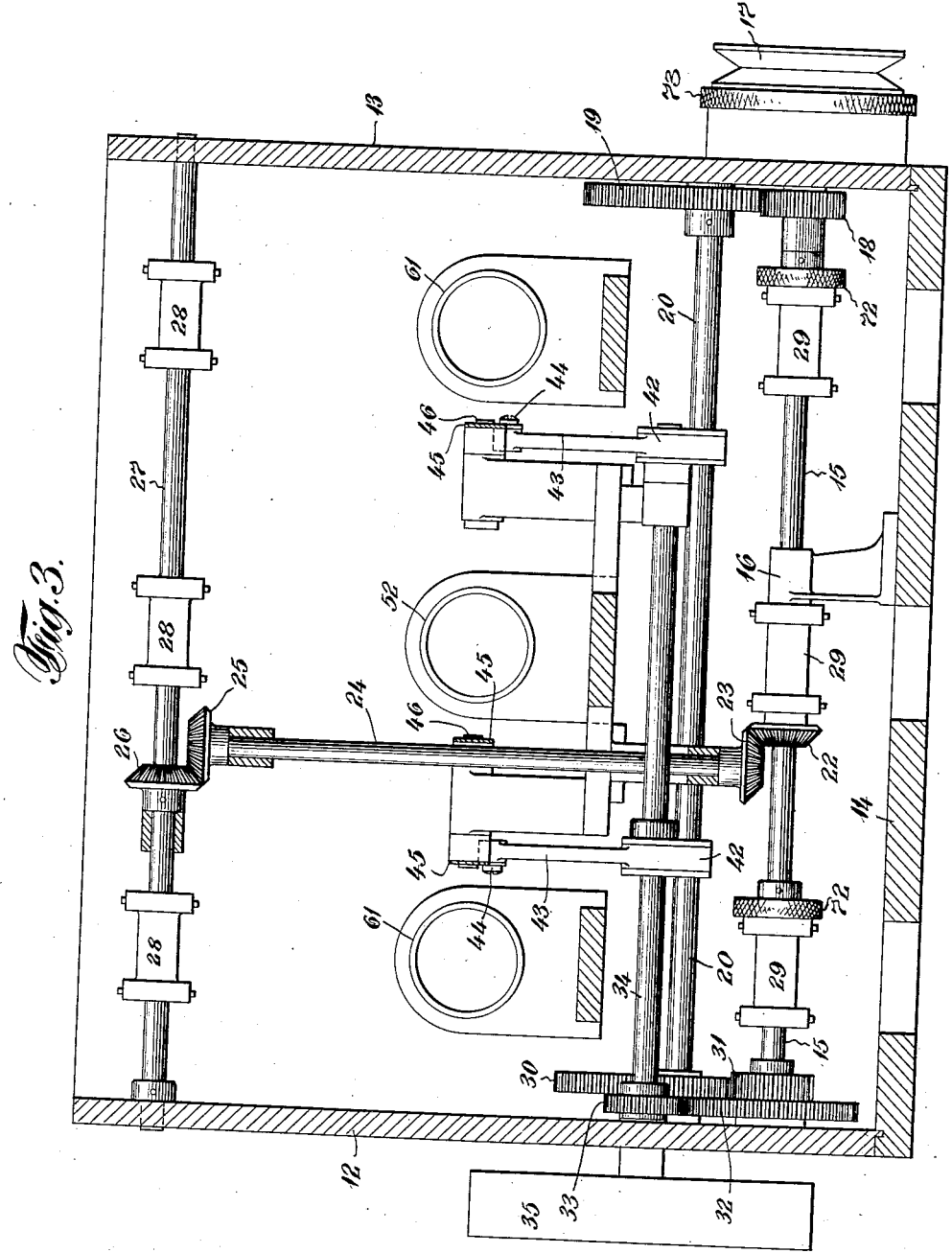
Fig. 3 is a section through the line 3—3 of Fig. 1.
Figure 4:
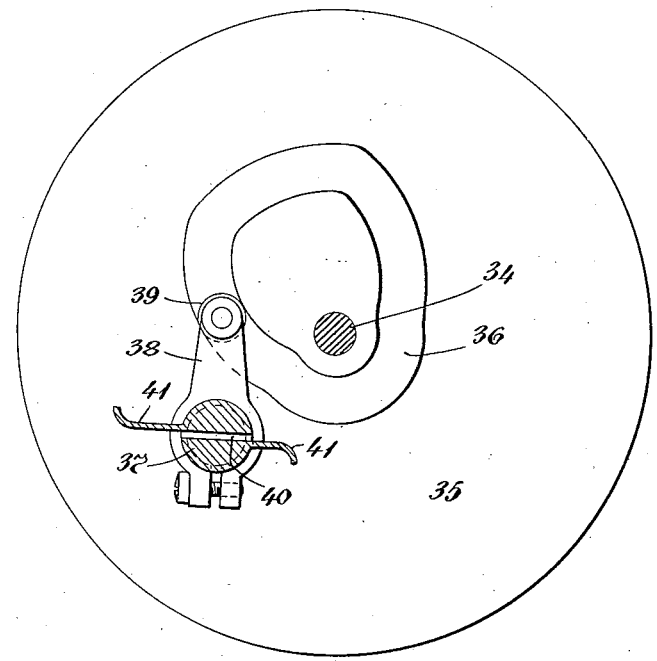
Fig. 4 is a section through the line 4—4 of Fig. 5, with parts removed.

The particular form of my device, illustrated in the accompanying drawings, comprises a cabinet formed of the front 10, the sides 12 and 13 and the bottom 14. A revoluble shaft 15, supported by the bracket 16 and a bearing in the side 13, has the V-shaped pulley 17 fixedly attached thereto. Carried by the shaft 15 is a gear wheel 18 meshing with the gear wheel 19 fixedly attached to the revoluble shaft 20. A handle or other suitable manual revolving means, can be attached to the extended end 21 of the shaft 20. The pulley 17 may be attached to a means of revoluble power by a belt, not shown. It is thus seen that the two shafts 15 and 20 may be revolved by either hand or mechanical power. A spur gear 22, fixedly attached to the shaft 15, meshes with the spur gear 23 fixedly attached to the revoluble shaft 24. The shaft 24 carries the fixedly attached spur gear 25 meshing with the spur gear 26 fixedly attached to the revoluble shaft 27. A series of film sprocket wheels 28, 28, 28, fixedly attached to the shaft 27, are in alinement with the film sprocket wheels 29, 29, 29, the central one of which is fixedly attached to the shaft 15 and the two end ones loosely carried thereby. The shaft 20 carries the fixedly attached gear wheel 30 meshing with the gear wheel 31 revoluble upon the shaft 15. The gear wheel 31 is fixedly attached to the gear wheel 32, also revoluble upon the shaft 15, meshing with the gear wheel 33 fixedly attached to the revoluble shaft 34. The shaft 34 carries the fly wheel 35 within which is the eccentric cam run-way 36. A rock-shaft 37, revoluble within the frames 12 and 13, carries the extended arm 38 having the roller 39 revoluble within the cam run-way 36. The rock-shaft 37 has a series of slots 40, 40, 40 and a series of extended guide plates 41, 41, the slots and guide plates being in alinement with the film sprocket wheels 28, 28, 28 and 29, 29, 29, so that a film 100 passing over the sprocket wheels will pass through the slots.

The shaft 34 carries a pair of eccentric cams 42, 42, having the extended arms 43, 43. One arm 43 is pivotally attached at 44 to an arm 45 fixedly attached to the revoluble shaft 46. The other arm 43 is similarly attached to an arm 45 fixedly attached to the revoluble shaft 46, the shaft 46 in this case carrying another fixedly attached arm 45. Each arm 45 has a right angle member, or shutter, 47.

The frame 48, 49 carries a light housing 50, a lens box 51, a lens box 52 and a film-carrying member comprised of the wall 53 having an aperture 54 and a gate 55 having an aperture 56 corresponding with the aperture 54. The gate 55 is spring hinged at 57, 57. The apertures 54 and 56 are in alinement with the axes of the lenses in the lens boxes 51 and 52.

On each side of that portion of the device comprising the frame 48, 48, the light housing 50, the lens boxes 51 and 52 and the film-carrying member is a similar arrangement comprising the frame 58, 59, the light housing 60, the lens boxes 61 and 62 and a film-carrying member. The film-carrying member comprises the wall 63 having an aperture 64, and a gate 65 having an aperture 66 corresponding with the aperture 64 and spring hinged at 67, 67. The apertures 64 and 66 are in alinement with the axes of the lenses in the lens boxes 60 and 61. The wall 63 is fixedly attached to the frame 59 by means of the extended support 68. The extended portion 69 of the frame 58 is revoluble around the headed screw bolt 70 screwed into the frame 71, the head of the bolt 70 retaining the member 69 from displacement. The pivotal axis of the member 69 around the bolt 70 is in alinement with the edge of the film 100, so that when this portion of the device is revolved, the movement will have one edge of the film as its axis of rotation.

Figure 5:
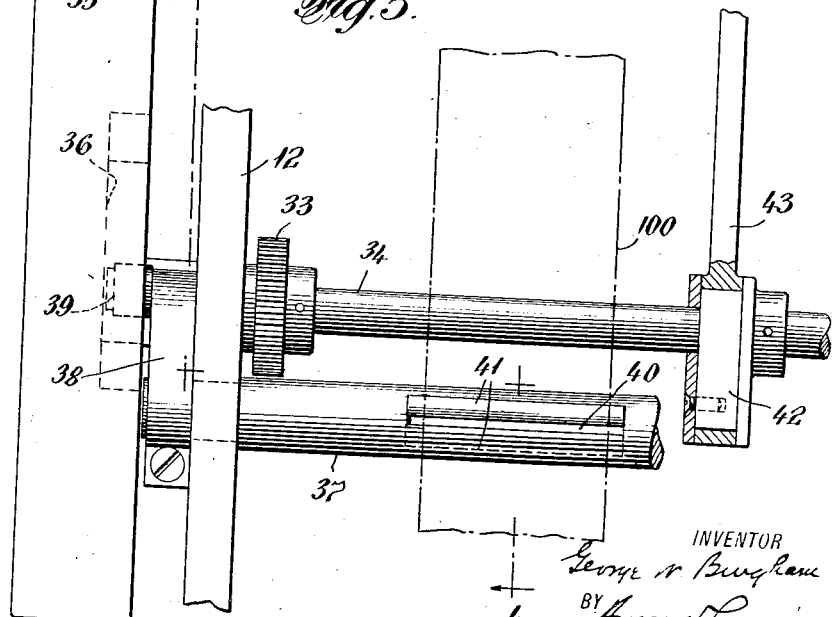
Fig. 5 is an enlarged fragmentary detailed elevation of the film-feeding mechanism and cam shaft, partly in section.

Any suitable framing means may be employed, and for purposes of illustration, the differential moving means for framing shown in the drawings and referred to in this specifiation are the differential moving means for framing fully described and explained in my United States Letters Patent No. 1,156,457, dated October 12, 1915, the specific means described herein being those shown particularly in Figs. 5 and 7 of said patent.

Referring to Fig. 10 on the sleeve 42$^A$ is mounted a worm gear 46$^A$ that meshes with the worm 45$^A$. The counter shaft 43$^A$, on which the worm 45 is mounted, is mounted in bearings 44$^A$, 44$^A$ that extend inwardly from the face of the disk 61$^A$ which is integral with the pulley 17. One end of the shaft 43$^A$ extends beyond the bearing 44$^A$ and has mounted thereon a spur gear wheel 64$^A$. A small counter-shaft 65$^A$, is carried by the bearing 47$^A$ and has the spur gear 66$^A$ at its lower end meshing with the spur gear 64$^A$ and the bevel gear 48$^A$ at its upper end, meshing with the teeth 52$^A$ upon the inner periphery of the member 73. In operation, under normal conditions, the member 73 is rotated with the pulley 17, the inner shaft portion 15 and the outer sleeve portion 42$^A$ being locked by the worm 45$^A$ and the worm gear 46$^A$. When it is desired to change the framing of the film relative to the film openings, the periphery 73 is grasped and held against rotation for a suitable period, until the proper framing conditions are obtained, after which the hold is released.

The construction of Fig. 11 is similar to that described above.

As the central sprocket 29 is fixedly attached to the shaft 15, it is taken as a standard to which the films upon the other two sprockets 29, 29 are framed.

In order to frame the film upon either of the other two sprockets 29, 29 with respect to the film upon the central sprocket 29, the respective member 72 is held from movement until the desired framing is accomplished as described above.

After all of the films are framed properly with respect to each other, it may be found necessary to frame all of them uniformly and simultaneously and, this may be accomplished by holding the member 73 from movement, the framing being accomplished by the movement imparted to the gear 18 and 19, the shaft 20 and the gears 30 and 31 to the shaft 15 and thus equally imparted to the three sprockets 29, 29, 29, thus giving a uniform and simultaneous framing movement to all three films.

Suitable framing means 72, 72 will frame the two end films with the central one and a suitable framing means 73 will frame all of the films simultaneously.

The operation of the device is as follows:—

A film 100 is passed over each sprocket wheel 28, being held in position by the pressure idler 74 and is then looped and passed between the wall 53 and the gate 55 in the central device and between the walls 63, 63 and the gates 65, 65 in the two end devices. The film is then passed through the openings 40, 40, 40 of the members 37, 37, 37 over the sprocket wheels 29, 29, 29 against which, in each case, it is held in abutment by the idler 75 carried by the member 76 pivoted at 77, the pressure being maintained by the spring 78 and then outwardly to a winding device.

The mechanism of the device operates as follows:—

The revolution of the shaft 15 revolves the sprocket wheels 28, 28, 28 and 29, 29, 29 uniformly thus causing the delivery of the same amount of film from the device as is fed into the device. The revolution of the shaft 15 is communicated to the shaft 20 which, in turn by means of the gears 30, 31, 32 and 33 revolves the shaft 34 and the wheel 35. The revolution of the wheel 35 causes the cam 38 to run within the cam-way 36 giving the shaft 37 a rocking movement, each rocking motion of which causes the film to move the proper distance past the apertures in the walls and gates, thus giving the film an intermittent movement equal to the size of the picture to be projected and presenting the plurality of pictures upon the film for purpose of projection. The revolution of the shaft 34 also causes the revolution of the eccentric cams 42, 42 intermittently operating the shutters 47, 47, 47, opening and closing the apertures in the walls and gates, the apertures being closed during the intermittent movement of the film and opening when the movement of the film is interrupted and a film picture presented to the apertures.

By the above described means three separate pictures are projected upon the screen side by side and may be exhibited in this manner. If, however, the pictures on the films are capable of being correlated into a single picture, this is accomplished upon the screen by revolving each end projecting mechanism until the edges of the pictures register and abut upon each other, thus presenting a single picture which is a coördination of the three pictures upon the three films.

It is to be noted that one, two or three films may be employed in the device, as described, and it is evident that the projecting elements may be increased to any desired number.

It is to be further noted that each film receives the full lighting power of its individual light and that the device presents all of the advantages of a single projection machine combined with the advantages of a plurality of correlated and non-correlated projections as described above.

I do not limit myself to the particular size, shape, number or arrangement of parts as shown and described, all of which may be varied without going beyond the scope of my invention as shown, described and claimed.

What I claim is:—

1. In a moving picture projector, in combination, a plurality of movable projecting means and means whereby a movable projecting means may be revolved upon the axis of an edge of a film therein in order that the pictures upon the film will be coördinated upon a screen with the pictures upon a film within one of the other projecting means to produce an extended picture.

2. In a moving picture projector, in combination, a plurality of movable projecting means, means for framing the pictures with respect to each other, means for simultaneously framing all of the pictures upon the screen and means whereby a movable projecting means may be revolved upon the axis of an edge of a film therein in order that the pictures upon the film will be coördinated upon a screen with the pictures upon a film within one of the other projecting means to produce an extended picture.

3. In a moving picture projector, in combination, a fixed projecting means, a plurality of movable projecting means and means whereby each movable projecting means may be revolved upon the axis of an edge of a film therein in order that the pictures upon the film will be coördinated upon a screen with the pictures upon a film within the fixed projecting means to produce an extended picture.

4. In a moving picture projector, in combination, a fixed projecting means, a plurality of movable projecting means in horizontal alinement with the fixed projecting means and means whereby each movable projecting means may be revolved upon the axis of an edge of a film therein in order that the pictures upon the film will be coordinated upon a screen with the pictures upon a film within the fixed projecting means to produce an extended picture.

5. In a moving picture projector, in combination, a fixed projecting means, a plurality of movable projecting means, means for framing the pictures with respect to each other, means for simultaneously framing all of the pictures upon the screen and means whereby each movable projecting means may be revolved upon the axis of an edge of a film therein in order that the pictures upon the film will be coördinated upon a screen with the pictures upon a film within the fixed projecting means to produce an extended picture.

6. In a moving picture projector, in combination, a fixed projecting means, a plurality of movable projecting means in horizontal alinement with the fixed projecting means, means for framing the pictures with respect to each other, means for simultaneously framing all of the pictures upon the screen and means whereby each movable projecting means may be revolved upon the axis of an edge of a film therein in order that the pictures upon the film will be coordinated upon a screen with the pictures upon a film within the fixed projecting means to produce an extended picture.

7. In a moving picture projector, in combination, a fixed projecting means, a plurality of movable projecting means and means whereby each movable projecting means may be revolved upon the axis of an edge of a film carrying a single series of pictures therein in order that the pictures upon the film will be coordinated upon a screen with the pictures upon a film carrying a single series of pictures within the fixed projecting means to produce an extended picture.

8. In a moving picture projector, in combination, a fixed projecting means, a plurality of movable projecting means in horizontal alinement with the fixed projecting means and means whereby each movable projecting means may be revolved upon the axis of an edge of a film carrying a single series of pictures therein in order that the pictures upon the film will be coordinated upon a screen with the pictures of a film carrying a single series of pictures within the fixed projecting means to produce an extended picture.

Signed at New York city, in the county of New York and State of New York this 16 day of April, 1919.

GEORGE W. BINGHAM.